United States Patent [19]

Baycura

[11] Patent Number: 5,100,642
[45] Date of Patent: Mar. 31, 1992

[54] METHOD OF GENERATING A FUEL FROM WATER AND A COMPOUND CONTAINING FREE RADICALS

[76] Inventor: Orestes M. Baycura, 2238 Central Park Dr., Campbell, Calif. 95008

[21] Appl. No.: 626,209

[22] Filed: Dec. 12, 1990

Related U.S. Application Data

[63] Continuation-in-part of Ser. No. 378,283, Jul. 11, 1989, abandoned.

[51] Int. Cl.[5] .............. C01B 3/02; C10L 1/00
[52] U.S. Cl. ................... 423/648.1; 44/300;
   48/197 R; 48/209; 123/1 A; 123/25 A;
   123/DIG. 12
[58] Field of Search ............ 423/648.1, 1 A;
   123/25 A, DIG. 12; 48/197 R, 209; 44/300

[56] References Cited

U.S. PATENT DOCUMENTS 2,489,051  11/1949  Sayward et al. ............... 44/50

FOREIGN PATENT DOCUMENTS 111864  12/1917  United Kingdom ............ 44/50

*Primary Examiner*—Wayne Langel
*Attorney, Agent, or Firm*—Robert Samuel Smith

[57] ABSTRACT

A fuel composed of water, a compound in which free radicals have been generated and a solute that stabilizes the free radicals while the fuel is in the liquid state but which releases the free radicals when the fuel is sprayed (vaporized) so that the free radicals then dissociate the water to form hydrogen gas in sufficient concentration to support combustion. The most readily available compounds in which free radicals can be generated to provide the fuel are hydrocarbons and carbohydrates. Free radicals may be generated in solids (e.g., sugar) by charring and grinding the sugar then mixing with acid. Free radicals may be generated in liquids by adding an acid. Polar liquids such as alcohols, aldehydes and ketones have been found to be the most effective stabilizers.

51 Claims, 2 Drawing Sheets

METHOD OF GENERATING A FUEL FROM WATER AND A COMPOUND CONTAINING FREE RADICALS

CROSS REFERENCE TO COPENDING U.S. PATENT APPLICATION

This application is a continuation-in-part of copending application Ser. No. 07/378,283, abandoned, filed Jul. 11, 1989.

TECHNICAL FIELD

This invention relates to a method for generating fuel and particularly to the use of organic compounds containing free radicals to generate hydrogen from water in a manner that has practical application as a source of fuel particularly for engines having combustion chambers.

BACKGROUND ART

Existing naturally occurring liquid or gaseous fuels are based on hydrocarbon sources that are finite and produce large volumes of oxidation products that are deleterious to humans and the environment. Production of hydrogen from coal and steam or other hydrocarbons requires metallic catalysts, high pressures, high temperatures or combinations of these factors. These techniques require more energy from petroleum than they produce and do not reduce the hazards to health or the environment.

A number of techniques may be considered by which water may be dissociated in order to produce hydrogen that could be used as fuel. One such technique is electrolysis which is well known. Another well known method used to provide fuel for lamps involves the formation of hydrides such as occurs when water is added to calcium carbide to form calcium oxide and the highly flammable acetylene (a hydride of carbon).

U.S. Pat. No. 4,338,291 to Yamada discloses a process for producing hydrogen using solar light by irradiating an aqueous solution of viologen in the presence of a metal complex as catalyst.

The use of reactions discussed in the foregoing paragraphs for the production of hydrogen to be used as fuel requires that the hydrogen be collected and compressed for storage purposes. The hazards posed by storing compressed hydrogen are well known.

Studies in medical research, particulerly cancer research, have shown that free radicals, such as are generated in the process of cooking meat, have the ability to split complex molecules such as comprise the cells of animal tissue.

An appropriate introduction to a discussion of free radicals may begin by distinguishing between free atoms, radical ions and free radicals.

Atoms of sodium or chlorine which are highly reactive by virtue of an unpaired electron are referred to as "free atoms".

Radical ions are those inorganic chemicals that contain extra electrons such as hydrolyzed sulfuric acid ($SO_4^{--}$) or hydrolyzed sodium hydroxide ($OH^-$).

A free radical is an atom or molecule that has one or more uncompensated (unpaired) electrons. The term is usually reserved for organic complexes such as the triaryl methyl type having large organic structures and longer lives than the unpaired electron of a single atom.

These uncompensated electrons exhibit magnetic properties that can be observed in a magnetic field, using a magnet and a radio frequency oscillator to cause signal variations in an output apparatus (electron spin resonance). Using this technique, it has been discovered that free radicals can be generated in a variety of compounds containing hydrogen and carbon by a number of methods. The list of compounds includes but is not limited to carbohydrates and hydrocarbons.

Carbohydrates are compounds that contain carbon, Hydrogen and Oxygen in groups having the general formula $C_x(H_2O)_y$ where x is equal to or greater than y.

Monosaccharides are carbohydrates with $x=y$.

Polysaccharides are carbohydrates wherein $x>y$ and are high molecular weight polymers of monosaccharides. Weak acids or enzymes can hydrolyze the polysaccharides to monosaccharides with different values of n. Polysaccharides are found in the cellulose of plants and trees.

Disaccharides are carbohydrates wherein $x=y+2$. Sucrose (common sugar) is a disaccharide composed of two forms of monosaccharides with n equal to 5 or 6.

Various methods for generating free radicals in carbohydrates, hydrocarbons and compounds generally containing carbon and hydrogen are listed as follows:

A. MECHANICAL ENERGY

Grinding a solid compound comprising hydrogen and carbon breaks down the atomic bonds to produce free radicals. Grinding as a preparatory step also increases the surface area when chemical reaction is to be used to produce free radicals. The newly formed free radical may eventually be compensated (paired with other unpaired electrons so as to eliminate the free radical) by exposure to Oxygen from any source or by exchange of valence electrons with other free radicals. (See K. Ulbert, Nature, v. 195, 175 (162) and S. Mrzowski, Carbon, vol. 19, 365 (1981).

B. CHEMICAL ENERGY

Strong acids, such as hydrochloric, sulfuric or phosphoric, can dissociate the chemical bonds in compounds containing hydrogen and carbon to produce free radicals. Bases may be used instead of acids to produce free radicals in polysaccharides. (See J. F. Thorpe, Thorpe's Dictionary of Applied Chemistry, vol. 50, 95, (1948).

A discussion of free radicals generated in sugar and hydrocarbon is found in Scientific American, Vol. 196, 91 (1957), C. Herzfeld; Scientific American vol. 189, 74 (1953), P. Bartlett; Scientific American vol. 243, 2, (1980), R. McIver; J. F. Thorpe Dictionary of Applied Chemistry, Vol. X p. 401 (1937); "The Chemistry of Free Radicals" W. Waters, Clarendon Press.

C. THERMAL ENERGY

Heat can produce free radicals in carbohydrates and hydrocarbons in the temperature range 500°-600° C. Solid or liquid carbohydrates have a maximum density of free radicals, $10^{20}$ per gram when heated to a temperature of 520° C. Petroleum based hydrocarbons like naptha or refinery oil residues produce identical values of free radicals in the same temperature range. (See Bennett et. al., Journal of Chemical Physics, vol. 23, 215 (1955).

D. RADIATION ENERGY

The energy of X-rays, gamma rays and radiation at high frequencies can produce free radicals in carbohydrates and hydrocarbons by rupturing the atomic bonds that have fixed energies. Radiation energy is linearly related to frequency and at some threshold frequency it can exceed the bond energy and generate free radicals. (C. Combission et al, Comptes Rendu, Vol. 238, p. 1392, (1954).

Free radicals are compensated naturally by combining with other free radicals or atmospheric oxygen. When free radicals are generated by acid, then if a base is added to the mixture in order to neutralize the acid, then the free radicals are compensated by the addition of the base.

In order to support combustion, hydrogen must be concentrated in air in at least a minimum amount that depends on pressure. The minimum amount at atmospheric pressure is 4%. (See Thorpe Dictionary of Applied Chemistry, vol. IV p. 429 (1937).

For further discussions of free radicals, see P. Bartlett, Scientific American vol. 189, 74 (1953), R. McIver, Scientific American, vol. 243, 2 (1980), J. F. Thorpe, Thorpe Dictionary of Applied Chemistry, vol. X, p. 401, (1937), or W. Waters "The Chemistry of Free Radicals" Clarendon Press.

DISCLOSURE OF INVENTION

This invention is directed toward a fuel that comprises a liquid mixture of water, a compound containing hydrogen and carbon in which free radicals have been generated and a constituent that prevents compensation of the free radicals when the fuel is in its liquid state. The stabilizing constituent is selected such that when the fuel is vaporized the free radicals are released to dissociate the water molecules to produce hydrogen so that the vaporized fuel contains a component of hydrogen in sufficient concentration to support combustion.

The invention is based on two discoveries by the inventor.

One discovery is that free radicals generated in a suitable compound such as a carbohydrate or hydrocarbon can dissociate water to form free hydrogen in accordance with a chain reaction that produces $10^2$ to $10^4$ molecules of hydrogen for each free radical.

The second discovery is that compensation of free radicals and dissociation of water in the presence of the free radicals can be prevented when the water and compound is a liquid mixture by the presence of a third constituent appropriately selected. Production of free hydrogen proceeds at a rapid rate when the mixture is vaporized.

The free radicals can be produced in renewable carbohydrates from plant sources or in liquid hydrocarbons obtained by petroleum refining. The method of generating the free radicals depends on the original physical structure of the carbohydrates or the hydrocarbon and may be mechanical (grinding), chemical (acids), thermal (heating), or irradiation at high frequencies. Preferred practice of this invention is that the grinding and/or heating operations be performed in a vacuum or inert atmosphere to prevent compensation.

Although I do not wish to be bound by theory, a possible explanation of the reactions that occur is as follows:

The stabilizer is selected from a group of compounds that are polar thereby forming a protective barrier between the water and compound phases yet do not form bonds with hydrogen so that, when the fuel is vaporized, the free radicals are readily released from the stabilized phase and dissociate the water.

The high rate of hydrogen evolution in sufficient concentration to support combustion from the relatively small concentration of free radicals in water may be explained by the high energy field associated with a free radical and the increased surface energy of the vaporized state. The number of water molecules decomposed into hydrogen by the free radicals (defined as the chain length) may be as high as $10^4$ theoretically. However, the conditions under which the invention is presently practiced places the chain length in the range $10^2$ to $10^3$.

An apparatus that generates the fuel of this invention on a continuous basis includes a conveying mechanism that transports the hydrogen/carbon containing compound from a source reservoir through a treatment zone then through one or more mixing zones and finally to a storage reservoir.

The conveying mechanism depends on the nature of the hydrogen/carbon compound. In one embodiment, a pipe conveys a liquid (e.g., hydrocarbon). In another embodiment, a screw conveys a powdered solid (e.g., sugar).

The structure of the treatment zone depends on the method used to generate the free radicals. For some compounds, such as sugar or solid cellulosic material, the treatment zone includes a grinding mechanism that grinds the compound.

The treatment zone may also contain an oven through which the compound passes after grinding. In this case, a preferred method of heating uses solar energy since an optimum temperature of 500° to 600° C. is required and is readily achieved by passing the compound through a zone of focused solar energy. The treatment zone preferrably has an inert atmosphere.

When a greater density of free radicals is required than can be obtained with grinding and/or heating or when the hydrogen-carbon compound is liquid, then the mixing zone includes a mixer which mixes the compound with a free radical generator (e.g., a strong mineral acid). In a second mixing step, a polar solute (e.g., a ketone or alcohol) is mixed with the product to stabilize the free radicals preparatory to mixing the product with water. In a third mixing step, the product is mixed with water. Finally, the product is neutralized if it is intended to store the product for an indefinite period of time in a corrosion sensitive environment.

The fuel can be used in engines of the internal or external combustion type or to drive a turbine. In a preferred embodiment, the fuel would be sprayed from an electromagnetic ejector and merged with a current of air controlled to provide a stream with a ratio of fuel to air optimized for most efficient operation.

DETAILED DESCRIPTION OF THE BEST MODES

The following detailed description illustrates the invention by way of example and not by way of limitation of the principles of the invention. This description will clearly enable one skilled in the art to make and use the invention and describes several embodiments, adaptations, variations, alternatives and uses of the invention, including what I presently believe is the best mode of carrying out the invention.

Figure 1:
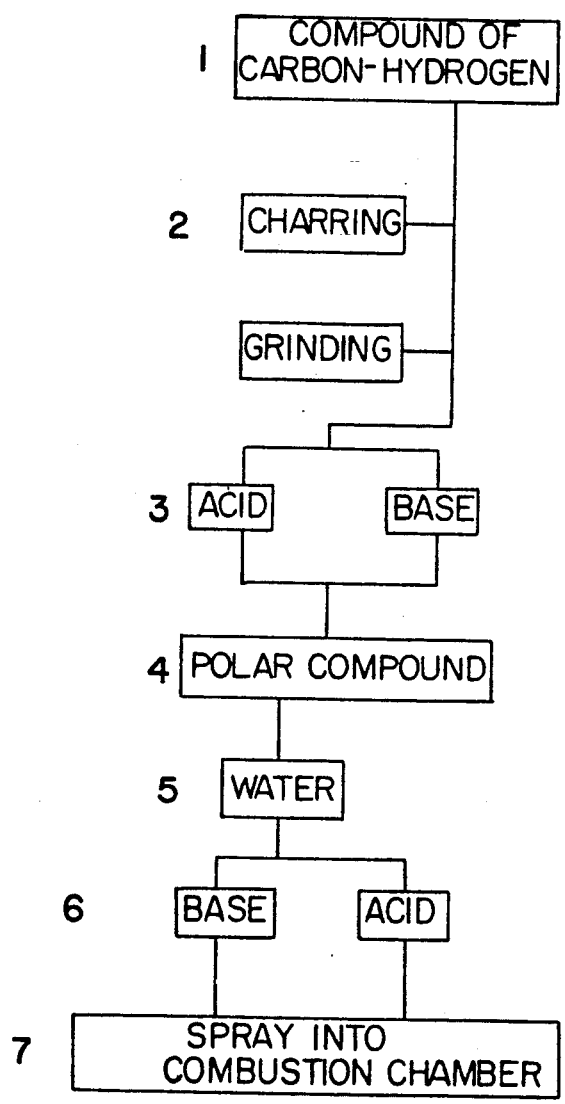
FIG. 1 is a flow chart for compounding the fuel of this invention.

A preferred method of compounding the fuel of the present invention is illustrated by the flow diagram of FIG. 1. Referring to FIG. 1, there is shown in step 1 the selection of a compound that is capable of providing and supporting free radicals. In optional step 2, the compound is pretreated such as by grinding and/or charring. In step 3, a second compound, (acid or alkali) is mixed with the first compound. In step 4, a polar third compound may be added to stabilize the free radicals. In step 5, a water is added. In step 6, a neutralizing compound is added. In practice, neutralization can be performed before or after step 4. In step 7, the fuel is sprayed into a combustion chamber to provide a combustible fuel of hydrogen mixed with gasified hydrogen-carbon containing compound.

Figure 2:
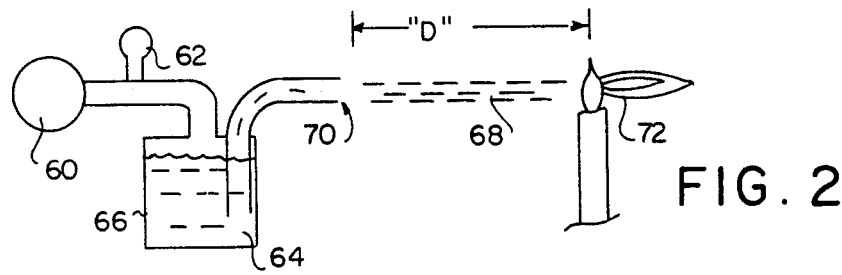
FIG. 2 shows an experimental arrangement for demonstrating that formulating and combusting the fuel involves the generation of free radicals and their role in producing free hydrogen in sufficient concentration to support combustion.

In order to support validity of the hypothesis that the vaporized fuel is predominantly hydrogen gas released from water molecules dissociated by free radicals, the experimental arrangement shown in FIG. 2 was used. There is shown a compressor 60 with pressure gage 62 that aspirates fuel 64 from container 66. The fuel is ejected as a spray 68 from the nozzle 70 toward a pilot flame 72. The pilot flame 72 is shown to be located at a distance "D" from the nozzle 70. It was experimentally determined that, for a given set of conditions, (composition of the fuel and pressure) the spray stream would not combust if the nozzle was less than a critical distance, D, from the pilot flame. D was approximately 10 cm. for most of the experiments that were performed. An explanation for this observation is that, as the vapor proceeds away from the nozzle, the concentration of free hydrogen increases due to the chain reaction supported by free radicals until, at a critical distance, D, combustion can occur where the concentration of hydrogen exceeds the critical concentration required to support combustion. The critical concentration depends on the pressure but is 4% hydrogen in air for air at atmospheric pressure and temperature.

A number of mixtures were evaluated which included a carbohydrate or hydrocarbon treated in one of several ways to generate free radicals. The mixtures were tested for their ability to support combustion, (i.e., function as a fuel) by spraying a jet stream of the mixture from a compressed air sprayer so as to form a vapor stream that could be ignited by a pilot light (propane gas flame) as discussed in the foregoing paragraph.

Hydrocarbons and carbohydrates were used throughout the experiments as convenient sources for generating free radicals however it will be understood that any compound which provides a relatively stable source of free radicals could be used and their use falls within the scope of this invention.

Several mixtures which are examples of various embodiments of the invention are given as follows:

EXAMPLE 1

Thermal Generation of Free Radicals

Crystalline sugar was heated to 450° C. for two hours and the char was ground by a mortar and pestle to a fine powder. A fuel mixture was compounded consisting of:
10 cc Ground sugar charred and ground
6 cc Sulfuric acid, 98% assay
20 cc distilled water This mixture has the advantage of a minimum number of constituents. A flame was produced when the nozzle issuing spray was placed at a distance of 8 cm. from the pilot light ignited by the pilot light.

EXAMPLE 2

Mechanical Generation of Free Radicals

Crystalline sugar is first ground to generate the free radicals. Then the following mixture is formulated:
15 cc crystalline sugar, ground
6 cc Sulfuric acid 98% assay
20 cc Distilled water Best results were obtained when the acid decomposed the ground sugar for over an hour prior to adding the water. A flame was obtained when the nozzle issuing sprayed fuel was placed at a distance $D=10$ cm from the pilot light (propane gas flame).

Unground sugar can be utilized but additional acid is required to produce an equivalent number of free radicals. The order of addition of water can be reversed but additional acid may be added to prevent compensation of the free radicals.

EXAMPLE 3

Chemical Generation of Free Radicals in Naptha

A mixture was compounded which included:
15 cc naptha
3 cc Sulfuric acid, 98% assay
10 cc distilled water A spray jet of the mixture was ignited by a propane pilot light.

Comment: A petroleum byproduct, e.g., naptha, is hydrophobic because it does not have residual electrical charges (i.e., it is nonpolar) and will not mix with water. By adding an acid to naptha, free radicals are formed and the mixture becomes hydrophillic. Petroleum based hydrocarbons may be a source of free radicals with a consequent reduction in atmospheric pollution because less petroleum is being burned.

In order to render the liquid fuel chemically nonreactive with the chamber walls for use in a typical combustion chamber, the fuel may be neutralized in accordance with an important feature of the invention as illustrated by example 4.

EXAMPLE 4

Chemical Generation of Free Radicals with Neutralization of the Acid

The final mixture consists of
7 cc Crystalline Sugar, ground
15 cc Hydrochloric acid 39% assay
5 cc Dimethyl Ketone (Acetone) 98% assay
20 cc Distilled water
15 cc Sodium Hydroxide, 98% assay The acid was added to the sugar and after two hours, the acetone was added. The water and hydroxide were mixed separately then added to the mixture. Any precipitate was separated by decanting before the mixture was sprayed. The spray jet was ignited by the pilot light, when the nozzle was placed at a distance of 10 cm. from the pilot light.

EXAMPLE 5

5 cc (2 gms) ground sugar
17 cc Hydrochloric acid, (36% assay) was added
Mixture set for three hours during and the solution blackened.
5 cc of acetone was added.
17 cc (17 gm) NaOH powder
100 cc water was added.

A flame was produced at the pilot light placed 10 cm from the nozzle issuing sprayed fuel.

In order to illustrate the stabilizing effect of the acetone, it was noted that when the sodium hydroxide is added to the mix before the addition of acetone, the small addition of acetone is not enough to support subsequent combustion and there will be no flame.

It may be noted in the foregoing examples that several methods have been combined to produce the required density of free radicals. It will be understood that, under the proper conditions, the objects of the invention could be achieved using any one of the three methods alone, chemical, mechanical or thermal or in combination with the other two to produce free radicals as disclosed in the literature. Therefore, the scope of the invention includes any method or combination of methods to produce the free radicals.

It follows that any thermal treatment of a compound to produce free radicals is within the scope of this invention, however the most practical temperature range is from 400° C. to 650° C. below which, rate of free radical production is too small for practical use and above which, most all solid hydrogen-carbon compounds tend to congeal thereby reducing effective surface area with a resultant drop in the density of free radicals. It may be noted further that the most desirable temperature range to produce the fuel of this invention, 400°-650° C. is much lower than the temperature used to produce H2+CO by cracking steam with coke.

The largest density of free radicals by heating is achieved by heating in an inert atmosphere, vacuum or an inert gas such as nitrogen wherein oxygen is excluded. The free radicals decay over a period of time. Tests on the fuel of this invention indicate that the practical shelf life of the fuel, dependent on the rate of decay of the free radicals, is greater than six months.

Although I do not wish to be bound by theory, a possible theory which would explain the chain reaction involving the free radical and dissociation of water and the stabilizing effect of the acetone in preventing compensation of free radicals in the presence of sodium, hydroxide is presented as follows:

The first initiating reaction in the chain involves the free radical associated with a carbon (from the hydrogen-carbon compound) and a water molecule:

—C.+H2:O→—C:OH+H.     1.

followed by

H.+H2:O→H2+OH.     2.

followed by

OH.+H2:O→O2+H2+H.     3.

with the accompanying reaction

—C:OH+—C:OH→—C2:O+H2     4.

etc.

In the above reaction equations, ":" indicates that O has accepted a pair of electrons to form the well known covalent double bond and "." represents the uncompensated electron of a free radical.

The time, t, for each step (1, 2, 3,) to occur was estimated on the basis of the kinetic theory of gases by calculating the time between collisions of the respective atomic entities.

The time, t', during which the entire chain reaction can occur is equal to the time required for an increment of the vaporized fuel to travel the distance, D, from the end of the nozzle to the pilot light.

This time, t', is given approximately by:

$$t' = TAD/V$$

where
V = volume of the container holding the liquid fuel
A = the cross sectional area of the nozzle
T = time required to empty the container The above formula assumes that the velocity of an increment of vapor throughout the distance, D, is constant.

Therefore, the number, n, of molecules of hydrogen generated by each initial free radical, —C., up to the time of combustion is t'/t.

This number, n, was found to be 1000 which is a number that agrees well with the chain lengths of other reactions involving free radicals.

Furthermore, on the basis of published data referenced in the RELEVANT ART, one may assume that the concentration of hydrogen gas at the point of flame ignition by the pilot light was at least 4%. Based on the calculation that each free radical produces 1000 molecules of hydrogen and that a concentration of 4% hydrogen was produced at the pilot light, then a concentration of $10^2$ free radicals of carbon must be present at the nozzle. This number also agrees approximately with what can be expected from the published data referenced in the RELEVANT ART.

To add further support to the hypothesized reactions, it is noted that, the apparatus of this invention vaporizes the fuel mechanically rather than by simply vaporizing the fuel using the latent heat of vaporization so that more surface energy is available to support the above reactions when collisions of the atomic entities occur.

The role of surface energy is further illustrated by the use of a solute to prevent compensation (generate hydrogen) while the fuel is still in the liquid state.

According to my theory supported by the above experimental observations, the solute must have a polar bond so that it is soluble in water and is attracted to the free radical by the strong electric field of the free radical. The most soluble compounds with polar bonds are the aldehydes and ketones that contain electrical charges on the carbon-oxygen part of the structure. Typical compounds are methyl-ethyl ketone, diethyl ketone (acetone), formaldehyde and acetaldehyde. Acetone is preferred because it may be obtained from renewable sources such as wood, plants or other natural cellulosic materials. The solute must bind the free radical loosely when in solution then separate rapidly, when vaporized to permit interaction between the electrical field of the vaporized free radical and the water vapor. It is envisioned that Acetone, or similar solute in sufficient amount, forms a cage around the free radical and the water vapor in a manner that is akin to a chelating agent although the bond is not nearly so strong. The energy for separation of a free radical from the solute is thought to be derived from creation of a large source of surface energy when the mix vaporizes.

Figure 3:
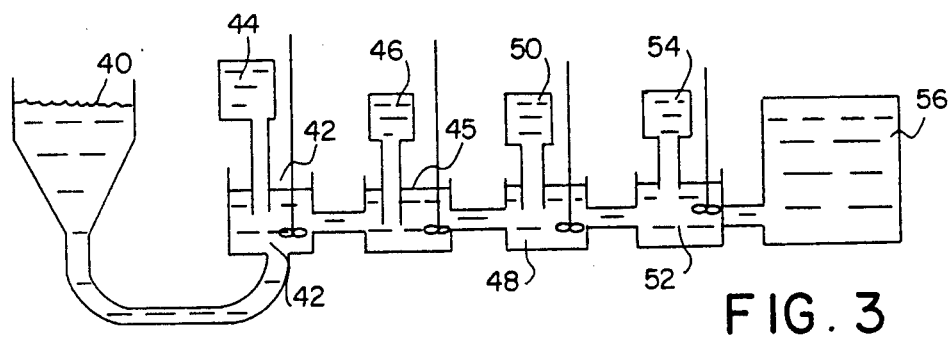
FIG. 3 shows an apparatus for producing fuel using the process of FIG. 1 wherein the hydrogen-carbon compound is a liquid such as a hydrocarbon.

One embodiment of the apparatus for carrying out the process of FIG. 1 is shown in FIG. 3. This construction is used in the case where the hydrogen/carbon compound is a liquid, e.g., naptha byproduct from petroleum refining processes. There is shown a receiving reservoir 40 from which the liquid compound passes into a first mixing tank 42 where it is mixed with an acid 44 to generate free radicals. Then the compound is pumped to a second mixing tank 45 where it is mixed with a stabilizing solute from reservoir 46. Then the compound is pumped to a third mixing tank 48 where it is mixed with water from source 50. Next the compound is neutralized in mixing tank 52 by additions of neutralizing agent from reservoir 54 from whence the fuel passes to storage reservoir 56.

Figure 4:
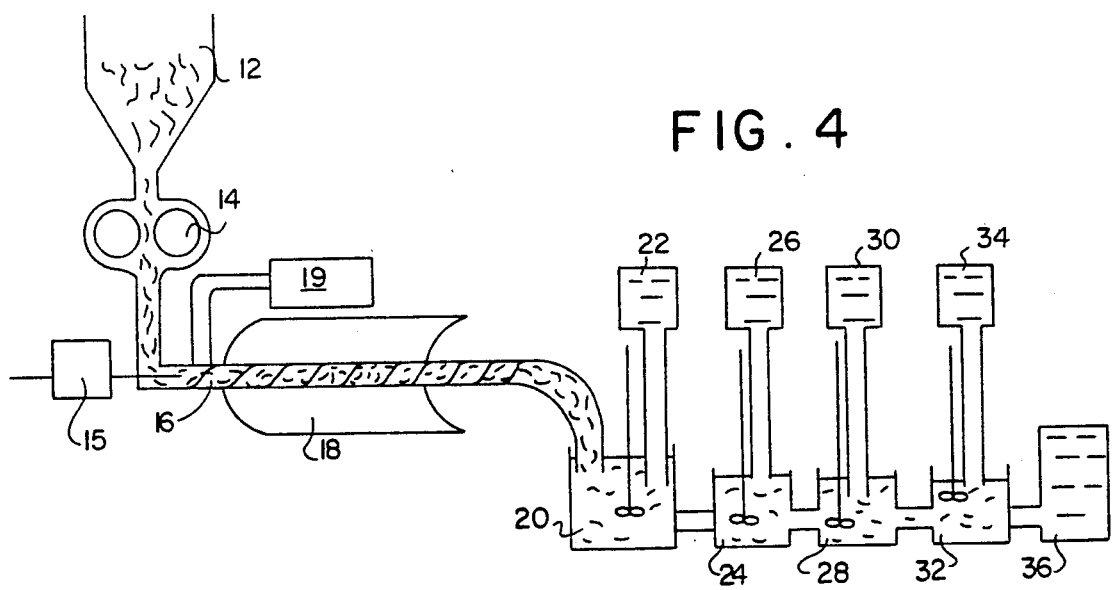
FIG. 4 shows an apparatus for producing the fuel using the process of FIG. 1 wherein the hydrogen-carbon compound is a solid such as a sugar.

Another embodiment of the apparatus for carrying out the process of FIG. 1 is shown in FIG. 4. This construction is used in the case where the hydrogen/carbon compound is a solid, e.g., sugar or cellulosic waste. There is shown the hopper 12 where incoming untreated compound is admitted to the process. The compound is first passed through a grinder 14 where the compound is ground to increase surface area. A motor 15 turns screw 16 in conduit 17 conveys the ground compound through a heater 18 which is shown to be a solar heat reflector in FIG. 2. The time and temperature in the heating zone must be carefully controlled in order that the thermal treatment produces the highest density of free radicals without causing the compound to congeal. An inert atmosphere is maintained in the heating area from a source of inert gas or vacuum 19 connected to the conduit 17. The ground charred compound passes into the first mixing chamber 20 where acid is added from reservoir 22. Then it is pumped to a second container 24 where it is mixed with solute from reservoir 26. Next the compound is passed into mixing container 28 where it is mixed with water from reservoir 30. Finally, the compound is pumped into container 32 where it is mixed with a neutralizing agent from reservoir 32 and deposited in a storage reservoir 36.

Examples have been presented which illustrate various embodiments of the invention. The various mixtures that have been compounded have included a hydrocarbon or carbohydrate treated to generate free radicals whose life, when water is added, depends on conditions such as addition of polar stabilizers. It has been demonstrated that, when the mixture is sprayed, the free radicals are released and catalyze the dissociation of water to form hydrogen gas in sufficient concentration to support combustion.

Two embodiments of apparatus have been described, one of which is capable of generating the fuel of this invention for the case where the initial starting compound is liquid and a second of which is capable of generating the fuel of this invention for the case where the initial starting compound is a solid.

INDUSTRIAL APPLICABILITY

This invention is a process for generating a fuel to be used, for example, in the combustion chamber of an engine. The fuel is sufficiently stable that it may be storable for a period of months in a stable liquid phase until it is discharged into the combustion chamber. The fuel, in its liquid storable phase, is relatively nonreactive, i.e., has a close to neutral pH. The fuel is generated from constituents that include renewable hydrocarbons and/or carbohydrates and thereby eliminates the dependency of industry on petroleum sources for energy.

Therefore the objects of this invention have been achieved which is to produce a fuel that may be used in the combustion chambers of engines and is derived from water dissociated by contact with free radicals generated in renewable carbohydrates or non renewable hydrocarbons.

The examples presented in the foregoing paragraphs are intended to be illustrative of the principles of the invention and are not intended to define limits to the scope of the invention. Variations to features of the invention will occur to one having ordinary skill in the art after reading the specification and studying the drawings which will also fall within the scope of the invention. I therefore wish my invention to be defined by the following claims with reference to the specification if need be.

I claim:

1. A method for producing a fuel which may be vaporized to produce a combustible vapor, which vapor includes hydrogen gas in sufficient concentration to support combustion, which includes the steps:
   (a) selecting a first compound containing hydrogen and carbon from which free radicals can be generated when operably mixed with a second compound operably selected to generate free radicals in said first compound;
   (b) preparing said first compound operably to generate free radicals in sufficient concentration to support combustion of hydrogen liberated by dissociation of water when added to water as a mixture having an operable ratio of said water and first and second compounds;
   (c) mixing said first compound with said second compound to generate free radicals in a mixture of said first and second compounds;
   (d) operably mixing said mixture with water thereby forming said fuel having a first ratio of water to said first compound and a second ratio of water to said second compound, which, when sprayed forms a vapor containing hydrogen gas;
   (e) said first and second ratios operably selected such that said vapor contains hydrogen gas from the dissociation of water in sufficient concentration to support combustion.

2. A method as in claim 1 which includes the additional step of selecting said second compound to be an alkali metal.

3. A method as in claim 1 which includes the additional step of selecting said second compound from the group which consists of alkali earth metals, and hydroxides and oxides of alkali and alkali earth metals.

4. A method as in claim 1 which includes the additional step of selecting said second compound to be an acid.

5. A method as in claim 1 which comprises the additional step of spraying the mixture of water and said first and second compounds into a combustion chamber thereby causing said free radicals to dissociate water and produce combustible fuel.

6. A method as in claim 1 wherein said preparation step includes the step of grinding said compound to produce a powder thereby generating free radicals and increasing surface area of said first compound.

7. A method as in claim 6 wherein said grinding step is performed in an inert atmosphere.

8. A method as in claim 1 wherein said preparation step includes:
 heating said first compound to a temperature for a period of time to char said first compound;
 allowing said first compound to cool;
 grinding said charred compound to a powder.

9. A method as in claim 8 wherein said heating step is performed in an inert atmosphere.

10. A method as in claim 8 wherein said temperature is selected from the range of temperature between 400° C. and 650° C.

11. A method as in claim 1 which further includes after said mixing step (c) the step of adding a solute to said mixture operably selected to suppress compensation of said radicals when water is subsequently added to said mixture.

12. A method as in claim 11 wherein said solute is selected from the group that consists of ketones, aldehydes and alcohols.

13. A method as in claim 4 which includes selecting said acid from the group that consists of sulfuric, halogenic and phosphoric.

14. A method as in claim 11 which includes after said water addition step (d) the additional step of adding a third compound to neutralize said second compound.

15. A method as in claim 4 which includes after said mixing step (c) the additional step:
 mixing in a solute selected to prevent compensation of said free radicals;
 and, after said water addition step (d); mixing in an agent to neutralize said acid.

16. A method as in claim 15 wherein said agent is an alkali metal.

17. A method as in claim 15 wherein said agent is selected from the group which consists of alkali earth metals and hydroxides and oxides of alkali metals and alkali earth metals.

18. A method as in claim 2 which includes after said mixing step (c) the steps:
 mixing in a solute selected to prevent compensation of said free radicals;
 mixing in an acid to neutralize said alkali.

19. A method as in claim 1 wherein said first compound is selected from the group which consists of hydrocarbons and carbohydrates.

20. A method of generating a vaporized combustible fuel which includes the step of spraying a fuel into a chamber to produce a gaseous combustible vapor wherein said fuel includes:
 a first compound selected from the group consisting of hydrocarbons and carbohydrates;
 a second compound operably selected and mixed with said first compound to generate free radicals in a mixture of said first and second compounds;
 water mixed with said mixture thereby forming said fuel having proportions of said water to said first and second compounds;
 said proportions operably selected such that said fuel, when sprayed, forms a vapor containing hydrogen gas in sufficient concentration to support combustion.

21. A method as in claim 20 wherein said operable proportions of said first and second compounds and water in said fuel mixture comprise:
 5 to 15 parts of said first compound by volume;
 3 to 17 parts of said second compound by volume;
 5 to 100 parts of water by volume.

22. A method as in 21 wherein said fuel further includes a solute selected to prevent compensation of said free radicals in an amount 2 to 8 parts by volume.

23. A method as in claim 22 wherein said solute is selected from the group that consists of ketons, alcohols and aldehydes.

24. A method as in claim 23 wherein said fuel further includes a compound selected to neutralize said second compound.

25. A fuel which comprises:
 (a) a first compound including hydrogen and carbon in which free radicals can be generated when operably prepared and mixed with a second compound operably selected to generate free radicals in said first compound;
 (b) said second compound added in a first ratio to said first compound thereby forming a mixture;
 (c) water added in a second ratio to said mixture thereby forming said fuel;
 (d) said first and second ratios operably selected such that, when said fuel is sprayed, hydrogen gas is produced in sufficient concentration to support combustion.

26. A fuel as in claim 25 wherein said first compound is selected from the group that consists of hydrocarbons and carbohydrates.

27. A fuel as in claim 25 wherein said second compound is an acid.

28. A fuel as in claim 27 wherein said acid is selected from the group that consists of sulfuric, phosphoric and halogenic.

29. A fuel as in claim 25 which comprises a polar compound operably selected to prevent compensation of said free radicals when said fuel is in the liquid state.

30. A fuel as in claim 29 wherein said polar compound is selected from the group that consists of aldehydes, ketones and alcohols.

31. A fuel as in claim 25 which further comprises a neutralizing compound.

32. A fuel as in claim 31 wherein said neutralizing compound is selected from the group that consists of alkali and alkali earth metals, and oxides and hydroxides of alkali and alkali earth metals.

33. A fuel as in claim 25 wherein proportions of said fuel comprise:
 7 to 15 parts of said compound containing hydrogen and carbon by volume;
 3 to 15 parts of said second compound by volume;
 10 to 100 parts water by volume.

34. A fuel as in claim 33 wherein said fuel further includes a solute operably selected to prevent compensation of said free radicals when said fuel is in the liquid state and wherein said fuel contains said solute in an amount of 2 to 8 parts by volume.

35. A fuel as in claim 34 wherein said fuel further includes:
 a compound operably selected to neutralize said fuel;
 said fuel containing said compound in an amount that will neutralize said fuel.

36. A fuel which comprises:

a mixture of at least one compound operably prepared to contain a concentration of free radicals;

water mixed in a proportion to said mixture of at least one compound;

said concentration to be sufficient and said proportion operably selected such that said fuel, when sprayed, contains hydrogen in sufficient concentration to support combustion.

37. A method for producing a combustible fuel which includes hydrogen gas in sufficient concentration to support combustion, which method includes the steps:
   (a) selecting a compound containing hydrogen and carbon in which free radicals can be generated;
   (b) operably treating said compound to generate free radicals in said compound in sufficient concentration to provide that when said operably treated compound is mixed with water in an operably selected ratio of compound to water and sprayed, said free radicals will dissociate water to produce hydrogen in sufficient concentration to support combustion;
   (c) mixing said treated compound with water in accordance with said operable ratio.

38. A method as in claim 37 wherein said operable treating step (b) includes grinding and heating to a temperature then allowing said compound to cool.

39. A method as in claim 38 wherein said temperature is selected from the range from 400° C. to 650° C.

40. A method as in claim 39 wherein said compound is selected from the group that consists of hydrocarbons and carbohydrates.

41. A method for producing a fuel which can be vaporized to produce a combustible vapor, which vapor includes hydrogen gas in sufficient concentration to support combustion which comprises:

preparing in a preparing means a first compound containing hydrogen and carbon to generate free radicals in sufficient concentration to support combustion, said first compound selected to provide free radicals when operably prepared and mixed with a second compound operably selected to generate free radicals in said first compound;

mixing in a first mixing means said first compound with said second compound such that free radicals can be generated in a mixture of said first and second compounds;

mixing in a second mixing means said mixture and water such that said fuel is formed having a first ratio of water to said first compound and a second ratio of water to said second compound, which, when sprayed forms a vapor containing hydrogen gas in sufficient concentration to support combustion.

42. A method as in claim 41 wherein said preparing means comprises means for grinding said compound.

43. A method as in claim 42 wherein said preparing means comprises a means for heating then cooling said ground compound communicating with said grinding means.

44. A method as in claim 42 wherein said grinding means includes a means for maintaining said compound in an inert atmosphere while said compound is being ground.

45. A method as in claim 43 wherein said heating means includes a means for maintaining said compound in an inert atmosphere while said compound is being heated.

46. A method as in claim 41 wherein said second mixing means further comprises a means operably arranged for mixing said ground and heat treated compound with acid and communicating with said heating means.

47. A method as in claim 46 wherein said second mixing means further comprises means operably arranged for mixing said mixture of ground and heat treated compound, water and acid with a polar compound operably selected to prevent compensation of free radicals in said mixture.

48. A method as in claim 47 wherein said second mixing means further comprises means operably arranged for mixing said mixture of said ground and heat treated compound, acid, water and polar compound with a neutralizing compound.

49. A method as in claim 43 wherein said heating means is a solar oven.

50. An apparatus for igniting a vaporized fuel comprising water and a compound containing free radicals which comprises:

a chamber means having a dimension in a direction;

means in operable combination with said chamber means for spraying said mixture into said chamber means in said direction;

said dimension selected in operable combination with said spraying means to be larger than a distance required for said water to be dissociated by said free radicals in sufficient concentration to support combustion;

means located in operable combination with said chamber means at said distance from said spraying means for igniting said sprayed fuel.

51. An apparatus as in claim 50 wherein said concentration is greater than four percent at standard atmospheric pressure and temperature.

* * * * *